Patented Sept. 16, 1924.

1,508,732

UNITED STATES PATENT OFFICE.

FRED CURTIS THORNLEY AND FRANK FORD TAPPING, OF KNIGHTSBRIDGE, LONDON, AND OTTO REYNARD, OF INKERMAN TERRACE, LONDON, ENGLAND; SAID TAPPING AND SAID REYNARD ASSIGNORS TO SAID THORNLEY.

STORAGE BATTERY.

No Drawing.   Application filed July 21, 1923.   Serial No. 653,052.

*To all whom it may concern:*

Be it known that we, FRED CURTIS THORNLEY, FRANK FORD TAPPING, and OTTO REYNARD, all subjects of the King of Great Britain, and residing, respectively, at Hyde Park Hotel, Knightsbridge, in the county of London, England, Hyde Park Hotel, Knightsbridge, in the county of London, England, and 8 Inkerman Terrace, in the county of London, England, have invented certain new and useful Improvements in Storage Batteries, of which the following is a specification.

This invention relates to the manufacture of plates for electric storage batteries or accumulators, and its principal object is the production of strength or cohesion in the lead compounds, such as lead peroxide, litharge, or the like, which are usually employed in combination with a grid or other mechanical support forming part of the plate.

According to this invention the lead compound is mixed with alginic acid or a salt in solution or pseudo-solution of alginic acid, as for instance any of the following:— sodium alginate, ammonium alginate, lead alginate, or the alginate of any other heavy metal. Such salts may be either in true aqueous solution, or in pseudo-colloidal or colloidal solution. The alginic acid may be prepared by known processes from mucilaginous sub-aqueous growths such as *Laminariaceæ Macrocystis* or *Laminariaceæ Nereocystis Luetkeana,* and when mixed with lead or lead oxides the resulting mass can be pasted or moulded into the recesses provided in the grid or metallic support, wherein it becomes insoluble and is not broken down by the action of the electrolyte. Alternatively we may use sodium alginate or other alginate of a nature which when mechanically mixed with lead oxides will bind the same into a mass possessing a certain rigidity or cohesion, from which it may in certain cases be found practicable to construct an accumulator plate without the use of a supporting grid. Some or all of the oxides may be replaced by a lead alginate consisting of the precipitate formed by the addition of a soluble alginate to an aqueous solution of a lead salt.

After pasting or moulding as aforesaid, the plate may be dried with or without heat and "formed" for electrical purposes in the usual manner, or may be "formed" immediately in a suitable electrolyte, or may be dipped for a short period into an acid solution and then "formed".

Good results have been obtained by the mixture of a solution containing one ounce of alginic acid with a lead composition containing twenty ounces of metallic lead, but we do not desire to limit the scope of the invention to the proportions thus stated by way of example.

We may for example take a relatively small quantity, say 5 to 10 per cent by weight of the total amount required, of a precipitate formed by the addition of a soluble alginate to an aqueous solution of a lead salt, thus making a gelatinous mass, add to this mass a preponderating quantity of lead oxide, and then mix with these substances a sufficient quantity of soluble alginate to make a paste, which is pressed into the recesses in the grid.

We have found that plates treated as above described will stand up after continuous operation in a large number of successive charges and discharges without any signs of wear or "sludging" such as usually take place progressively in ordinary accumulator plates.

What we claim and desire to secure by Letters Patent of the United States is:—

1. A plate for an electric storage battery in which alginic acid mixed with lead is introduced into the recesses in the grid.

2. A plate for an electric storage battery in which alginic acid mixed with lead in the form of a lead oxide is introduced into the recesses in the grid.

3. A plate for an electric storage battery in which the lead compound comprises a soluble salt of alginic acid mixed with lead oxide.

4. A plate for an electric storage battery in which the lead compound comprises ammonium alginate mixed with lead oxide.

5. A plate for an electric storage battery comprising as the active mass the precipitate formed by the addition of a soluble alginate to an aqueous solution of a lead salt.

6. A plate for an electric storage battery comprising as the active mass a relatively small proportion, say 5 to 10 per cent, of the precipitate formed by the addition of a soluble alginate to an aqueous solution of a lead salt, and a relatively large proportion, say 90 to 95 per cent, of a mixture of lead oxide with a further quantity of soluble alginate.

FRED CURTIS THORNLEY.
FRANK FORD TAPPING.
OTTO REYNARD.